US010860834B2

United States Patent
Tagra et al.

(10) Patent No.: US 10,860,834 B2
(45) Date of Patent: Dec. 8, 2020

(54) ENHANCED BIOMETRIC PRIVACY

(71) Applicant: Adobe Inc., San Jose, CA (US)

(72) Inventors: Sanjeev Tagra, Haryana (IN); Sachin Soni, New Delhi (IN); Prasenjit Mondal, West Bengal (IN); Ajay Jain, Ghaziabad (IN)

(73) Assignee: ADOBE Inc., San Jose, CA (US)

( * ) Notice: Subject to any disclaimer, the term of this patent is extended or adjusted under 35 U.S.C. 154(b) by 0 days.

(21) Appl. No.: 16/359,378

(22) Filed: Mar. 20, 2019

(65) Prior Publication Data

US 2020/0302152 A1 Sep. 24, 2020

(51) Int. Cl.
*G06K 9/00* (2006.01)
*G06F 21/32* (2013.01)
*G06K 9/62* (2006.01)

(52) U.S. Cl.
CPC ......... *G06K 9/00093* (2013.01); *G06F 21/32* (2013.01); *G06K 9/00073* (2013.01); *G06K 9/6215* (2013.01)

(58) Field of Classification Search
CPC ........... G06K 9/00093; G06K 9/00073; G06K 9/6215; G06F 21/32
See application file for complete search history.

(56) References Cited

U.S. PATENT DOCUMENTS

| | | | | |
|---|---|---|---|---|
| 2007/0297653 A1* | 12/2007 | Bolle | ................. | G06K 9/00073 382/124 |
| 2014/0241598 A1* | 8/2014 | Fedele | ............... | G06K 9/00073 382/125 |
| 2015/0043789 A1* | 2/2015 | Ferren | .................. | H04N 1/2112 382/115 |
| 2015/0067344 A1* | 3/2015 | Poder | .................... | G06F 21/316 713/176 |
| 2016/0149904 A1* | 5/2016 | Kim | ....................... | G06K 9/0061 713/186 |
| 2016/0196461 A1* | 7/2016 | Hara | ................... | G06K 9/00073 382/125 |
| 2016/0321830 A1* | 11/2016 | Cvetkovic | ............ | G06K 9/4671 |
| 2019/0340411 A1* | 11/2019 | Lu | ........................ | G06K 9/6202 |

\* cited by examiner

*Primary Examiner* — Premal R Patel
(74) *Attorney, Agent, or Firm* — Shook, Hardy & Bacon L.L.P.

(57) ABSTRACT

Methods, systems, and software are disclosed herein for protecting the privacy of users in images and to prevent or mitigate the occurrence of privacy breaches. In an implementation, a biometric privacy service identifies a biometric marker in an image of a scene, such as a fingerprint, a retina, or an iris. The service then identifies one or more features of the biometric marker to be modified. The biometric service also identifies one or more modifications to make to the one or more features of the biometric marker and generates a modified version of the biometric marker that reflects the modification(s). The image is updated by the service with the modified version of the biometric marker, so that the biometric marker can no longer be used for unwanted purposes, whether they be malicious in intent or benign.

18 Claims, 10 Drawing Sheets

| MINUTIAE / STRAIGHT-LINE VERSION | |
|---|---|
| ridge termination | —————— |
| bifurcation | >— |
| independent ridge | —————— |
| dot or island | — |
| lake | —<>— |
| spur | —∠— |
| crossover | —Z— |
| 701 | |

FIGURE 7

ENHANCED BIOMETRIC PRIVACY

TECHNICAL FIELD

Aspects of the disclosure are related to the field of digital security and in particular to biometric privacy technology.

BACKGROUND

Privacy breaches have become an unfortunate aspect of modern life. Large scale hacks, such as the theft of millions of usernames, passwords, and other personal information, occur frequently and to devastating effect. In a more recent development, malicious actors have extracted the fingerprints, retina patterns, and other identifying biometric markers from online photos of people in attempts to steal their identity.

In an example, a user may pose in a photo with her hand facing outward in the universal peace sign. If the photo is subsequently uploaded to a social media site or other accessible platform, malicious actors need only download the image and extract the exposed fingerprints using readily available tools. The malicious actors can then replicate the fingerprints onto synthetic materials, thereby giving them the ability to impersonate the user.

Users who are aware of such threats have begun to change their behavior in response. For instance, users sometimes pose with their palms facing away from the camera such that the back of their hands appear in photos, rather than their palms. Unfortunately, such a technique is only minimally effective since it depends on users to consistently modify their behavior. Regardless, other types of biometric markers (e.g. retina and iris patterns) cannot be shielded in the same way and thus remain susceptible to theft.

Aside from malicious activity, users may also have a strong interest in protecting their biometric information more generally. Such sentiments may include the desire to limit the dissemination of their biometric information online to protect against the unwanted collection of it by governments, businesses, individuals, and the like. This concern will only increase as biometric markers become an increasingly susceptible to misappropriation of all types.

OVERVIEW

Technology is disclosed herein for protecting the privacy of users in images and to prevent or mitigate the occurrence of privacy breaches. In an implementation, a biometric privacy service identifies a biometric marker in an image of a scene, such as a fingerprint, a retina, or an iris. The service then identifies one or more features of the biometric marker to be modified. The biometric service also identifies one or more modifications to make to the one or more features of the biometric marker and generates a modified version of the biometric marker that reflects the modification(s). The image is updated by the service with the modified version of the biometric marker, so that the biometric marker can no longer be used for unwanted purposes, whether they be malicious in intent or benign.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates a set of reference features in an implementation.

DETAILED DESCRIPTION

Figure 1:
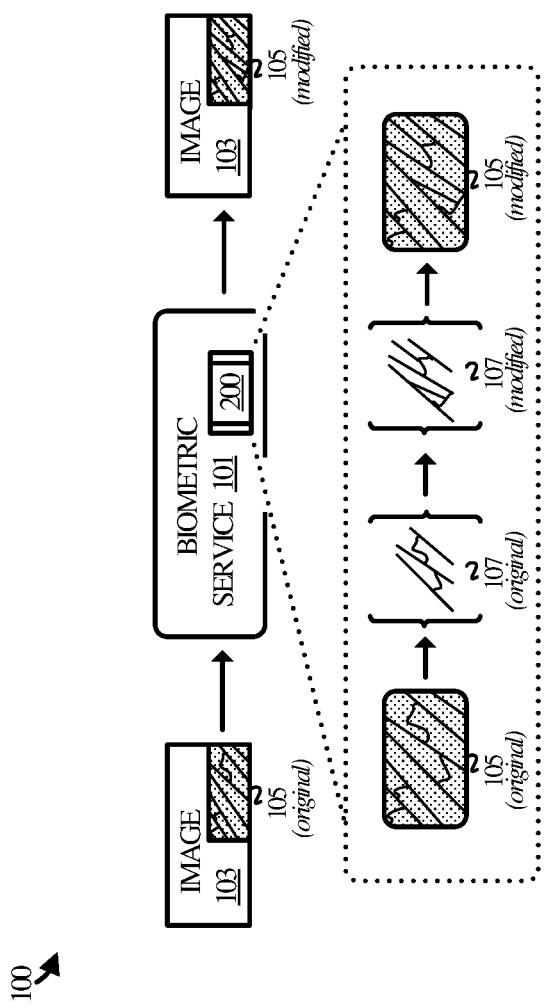
FIG. 1 illustrates an operational example of biometric privacy technology in which a biometric service transforms biometric markers to promote user privacy.

Technology disclosed herein promotes privacy in images by modifying the biometric markers that may be found in the images. In addition, the biometric markers may be modified in such a way as to maintain the aesthetic quality of an image.

In an implementation an image in a photo, video, or other such content includes a biometric marker that may be susceptible to misuse by third-parties. As an example, a photo may be taken of a user with his or her palms facing outward such that one or more fingerprints are captured in the photo. Other examples include photos or video that capture retinas, irises, or other biometric markers with sufficient clarity to be susceptible to misuse. Such situations are increasingly common as the capabilities and resolution of image capture equipment improves.

A biometric service is disclosed herein to mitigate the risk of biometric markers in images being used for unwanted purposes as discussed above. At a high level, the biometric service automatically identifies biometric markers in images and modifies their features such that a given biometric marker is no longer able to identify a person. Moreover, the features as-modified still resemble biometric features. That is, the biometric marker in its modified form still resembles the biometric marker in its original form, but with its features changed to an extent that it cannot be used to impersonate or track a user.

In an implementation, the biometric service extracts a biometric marker from an image and identifies one or more features of the biometric marker to be modified. Examples of biometric markers include, but are not limited to, fingerprints, retinas, and irises, as well as any other type of marker that may be used to identify a person. Non-limiting examples of features include fingerprint ridges, the blood vessels of a retina, and the fibers and color(s) of an iris.

The biometric service then identifies one or more modifications to make to the one or more features of the biometric marker and generates a modified version of the biometric marker that reflects the one or more modifications. As an example, many biometric features may be represented as lines and line segments such as those that form the ridges of a fingerprint or the blood vessels in a retina. The biometric service may therefore add one or more segments to a feature, remove one or more segments from a feature, or both, and by editing the pixel values associated with a given line or line segment in an image of a given biometric marker.

The modified version of the biometric marker thus differs from the original version of the marker extracted from the original image. The biometric service proceeds to update the original image with the modified version of the biometric marker such that the original version of the marker can no longer be used for unwanted purposes.

In some implementations, the biometric service identifies the features of the biometric marker by matching them to a set of reference features. That is, for each feature, the biometric service determines which one of the reference features (if any) is most similar to the feature. The determination of which reference feature matches the feature may influence how the feature is modified. If none of the reference features match, then the feature may be discarded and left unmodified.

In some cases, the set of reference features is merely a subset of the all the possible feature patterns that may be found in the biometric marker. In addition, the set of reference features may be the ones used most prominently to make identifications. Limiting the set of features to be modified to those that match the reference features reduces the number of features that need be modified. Limiting the set also increases the likelihood that the modifications impact the effectiveness of the modified version of the biometric marker with respect to mitigating or eliminating the unwanted use of a biometric marker.

In order to identify a match for a feature, the biometric service may in some implementations generate a straight-line version of the feature. In addition, the biometric service may generate or obtain straight-line versions of the reference features. The biometric service may thus compare characteristics of the straight-line versions of the feature and the reference features in order to identify a match. Examples of the characteristics of the straight-line versions of the features include—but are not limited to—a number of angles, a number of segments, and a set of normalized coordinates for each of the segments.

In some implementations, generating the modified version of the biometric marker includes generating a skeletonized image of the biometric marker. Skeletonization is a process for reducing foreground regions in a binary image to a skeletal remnant that preserves the extent and connectivity of an original image while throwing away most of the foreground pixels. A skeletonized image of a biometric marker is an image that has had the thickness of its lines thinned relative to a reference image. The biometric service then makes the modifications to the features in the skeletonized image, resulting in the modified version of the biometric marker. As mentioned, the modifications may include adding segments to the features, removing other segments from the features, or both.

The biometric service may in some implementations update the image with the modified version of the biometric marker by superimposing it onto the image. In other cases, the biometric service may change the pixel values of the image based on the skeletonized image of the modified version of the biometric marker. The skeletonized image can serve as a map to guide the biometric service in its editing of the image.

Figure 10:
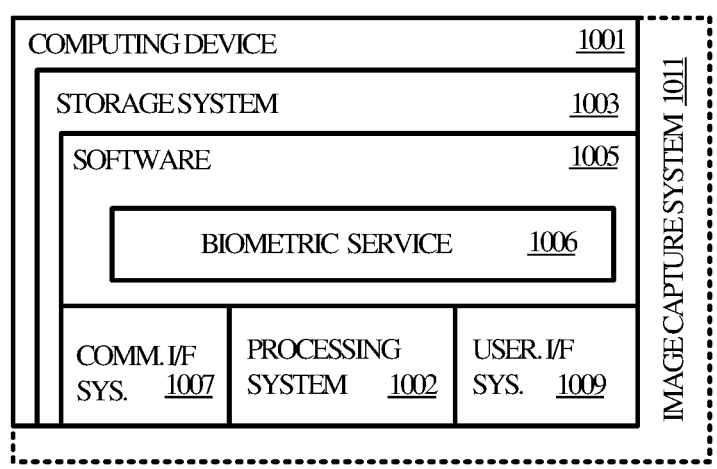
FIG. 10 illustrates a computing device suitable for implementing the various operational environments, architectures, processes, scenarios, and sequences discussed below with respect to the Figures.

Referring to the drawings, FIG. 1 illustrates an operational example 100 of biometric privacy technology. Operational example 100 includes biometric service 101, which may be implemented as a software application or a feature thereof on one or more computing devices, of which computing device 1001 in FIG. 10 is representative. For example, biometric service 101 may be implemented on one or more user devices, such as a mobile phone, digital camera, laptop computer, tablet computer, desktop computer, gaming device, or the like. Biometric service 101 may also be implemented on one or more computer server devices, virtual machines, containers, appliances, or combinations and variations thereof.

Figure 2:
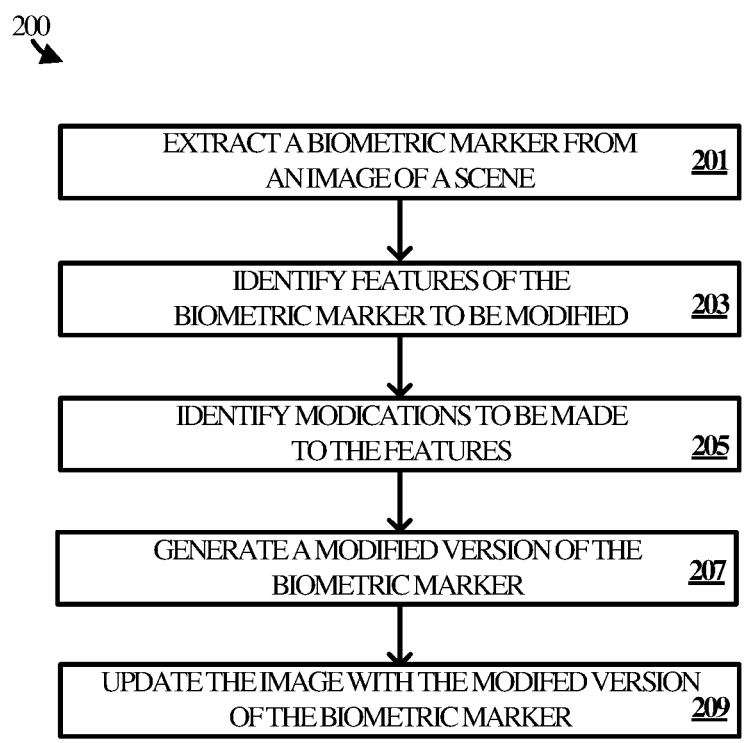
FIG. 2 illustrates a biometric transformation process employed by the biometric service of FIG. 1 in an implementation.

Biometric service 101 may be employed in a variety of computing environments such as locally, in a remote environment, distributed across multiple environments, or hosted in a cloud environment, as well as in any combination or variation thereof. Biometric service 101 utilizes a transformation process 200 to enhance the privacy of individuals in images such as photos, video, and the like. Transformation process 200 may be implemented in program instructions that, when executed by one or more processors, direct one or more computing devices to operate as described herein for transformation process 200, referring parenthetically to the steps in FIG. 2.

In operation, biometric service 101 extracts a biometric marker in an image of a scene (step 201). The image may be a photograph or a segment of video, for example, captured by an image capture device of a scene that may include biometric markers. Biometric service 101 scans the image for the presence of biometric markers such as fingerprints, retinas, irises, or any other type of biometric marker that may identify a person and extracts one or more of them from the image. The extracted marker may itself be an image such that biometric service 101 may be considered to have extracted an image of the biometric marker from the image.

In some implementations, biometric service 101 may employ an object detection algorithm to detect the presence of biometric markers in an image. In such cases, the object detection algorithm detects regions in an image that include fingers/thumbs and eyes by searching for patterns in the pixels of the images that match known patterns that are representative of such objects. In other implementations, biometric service 101 may employ a machine learning model to identify regions that include such objects. In such cases, the machine learning model is trained with images of known objects and is therefore able to recognize the same or similar objects in new images. Other techniques for detecting biometric markers in images are possible and may be considered within the scope of the present disclosure.

Next, biometric service 101 identifies features of the biometric marker to be modified (step 203). While a given biometric marker may have many features (upwards of 150 in a fingerprint, for example), a subset of them are more distinguishable than others. The subset, sometimes referred to as the major features, are thus used to distinguish one marker from another, or one individual from another. It is those features that biometric service 101 attempts to extract from the biometric marker and then classify as a one of a set of reference features. Those of the features that match one of the reference features qualify as candidates to be modified. Others of the features that do not match one of the reference features may remain unmodified.

It may be appreciated that the features of fingerprints are expressed in the image of the biometric marker in pixels. The pixels are colored such that they form the ridges and valleys of the fingerprints or, in the case of retinas, the network of blood vessels in the eye. The features of irises are the patterns formed by the fibers of an iris and possibly other characteristics of the iris, which may also be expressed via the pixel values of an image.

Having identified features to be modified, biometric service 101 proceeds to identify the modifications to make to the features (step 205). The modifications are intended to change the biometric marker enough that it can no longer be used for unwanted purposes, such as to impersonate a user or to track the online behavior of a user. Examples include adding a segment to a feature, removing a segment from a feature, or both. Other examples include changing the color, shape, intensity, and/or location of a feature.

Next, biometric service 101 generates a modified version of the biometric marker that reflects the identified modifications (step 207). Biometric service 101 may make the modifications to the features in a variety of ways. For instance, biometric service 101 may modify the image of the biometric marker that was extracted in step 201 above. Alternatively, biometric service 101 may modify a different image of the biometric marker derived from the extracted image such as a skeletonized version of the image.

The modified version of the biometric marker may differ from the original version of the biometric marker to such an extent that the modified marker can no longer be used to identify the person to which it belongs. In some scenarios, biometric service 101 changes the features enough that the transformed biometric marker as a whole is sufficiently dissimilar from the original biometric marker. This may be accomplished by calculating a similarity metric that represents the difference in appearance between the original marker and the transformed marker. The similarity metric can then be evaluated against a threshold value to determine if the transformed biometric is sufficiently dissimilar from the original. If so, then biometric service 101 may update the image of the scene with the modified version of the biometric marker (step 209), including replacing the original biometric marker in the image with the modified biometric marker. If not, then the features of the biometric marker can be further altered on an iterative basis until the modified biometric marker it is sufficiently dissimilar from the original marker.

Referring back to FIG. 1, operational example 100 provides a brief illustration of transformation process 200 as employed by biometric service 101 with respect to image 103. In operation, image 103 may be taken of a scene that includes a biometric marker 105. For instance, a person may be photographed with his or her palms facing the camera in a selfie, a group photo, surveillance footage, or any other type of photo or video recording.

Figure 6:
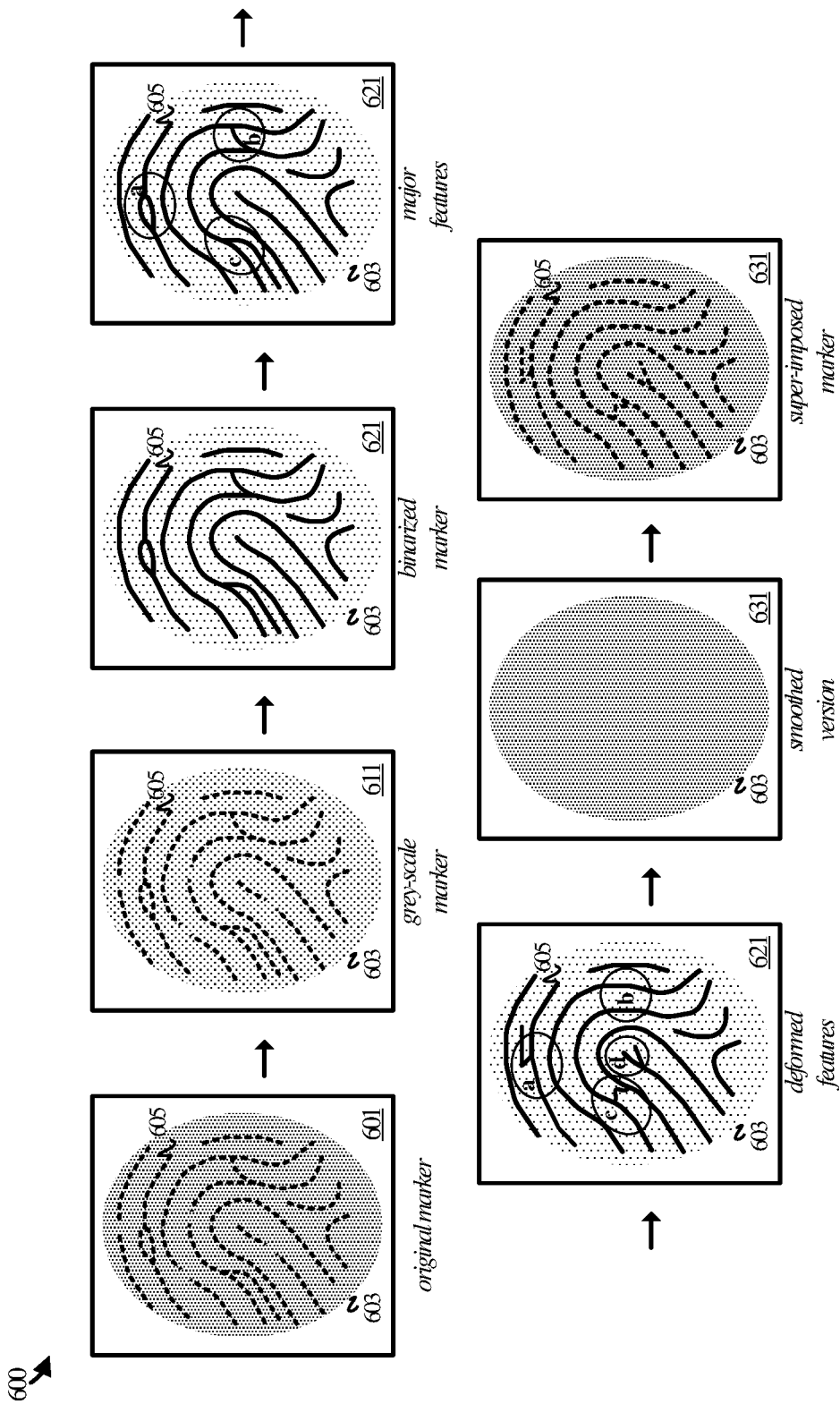
FIG. 6 illustrates an operational scenario in an implementation.

Biometric marker 105 in its original state includes various features. In the case of fingerprints, the features include ridges and valleys. Retina patterns, on the other hand, are formed by blood vessels within the retina, while iris patterns may be described in terms of their structure and color. More specifically with respect to fingerprints, a fingerprint can be categorized as one of several patterns including an arch, a loop, and whorl (and sub-categories within macro categories). The patterns are formed by the ridges and valleys of a fingerprint, which themselves may be classified as fitting specific patterns. The elemental patterns created by the ridges and valleys are the features of the fingerprint and may be referred to as minutiae, several of which are illustrated in FIG. 6.

The features of a biometric marker may thus be identified and classified. Biometric service 101 therefore takes image 103 as input and examines it to identify the features in biometric marker 105. The features are then compared to a set of reference features to identify the major features 107 in the image to be modified. As an example, biometric service 101 may identify the ridges and valleys of a fingerprint and then, from there, the minutia formed by some of the ridges and valleys.

In some implementations, biometric service 101 compares straight-line versions of the features to straight-line versions of the reference features. A straight-line version of a feature is computed by approximating straight lines along the segment(s) of a ridge, blood vessel, or the like. The number of line segments in the feature is counted and the normalized coordinates of the line segment endpoints are computed. The normalized coordinates are based on a bounding box drawn around the feature. The normalized lengths of each line segment are also computed with respect to the bounding box. Finally, the angle between two segments (if any) is computed and the angles are normalized, again with respect to the bounding box.

The characteristics computed for the straight-line version of a given feature may be compared against the characteristics of the straight-line versions of the reference features to determine if there is a match. For instance, for a reference feature to be a match, the number of line segments between the feature and the reference feature should be the same. In addition, the value of the angles between two line segments should be the same or within a threshold distance. The lengths of the segments should also be similar or within a threshold distance. Finally, there should be a number of line segments greater than a threshold whose normalized coordinates are similar or within a threshold distance from each other.

Having identified the major features 107, biometric service 101 modifies one or more of the major features. For example, the three main, angled lines of major features 107 that run generally parallel to each other are connected by two curved lines. The curved lines are transformed by modifying their junction points with the main lines and two new straight lines are added. The major features 107 are thus modified and, as such, so is biometric marker 105. Biometric service 101 may modify the features by editing the pixels in the image of biometric marker 105 that correspond to a subject feature and its surroundings. Biometric service 101 may add a segment by changing the color of a line of pixels to match the color of the remainder of a feature. A segment may be removed by changing its pixel colors to match a background color or to no color at all in the case of a skeletonized image.

The specific location of a new segment may be random in some scenarios. That is, biometric service 101 may determine randomly (or pseudo randomly) where along an existing feature to place a new segment. Similarly, biometric service may determine randomly (or pseudo randomly) where along a feature to remove a segment.

Biometric marker 105 in its modified state is re-integrated into image 103 to mitigate against identify theft or other unwanted actions. The re-integration may be accomplished by, for instance, over-writing portions of image 103 corresponding to all or portions of biometric marker 105, by creating a new instance of image 103 with the transformed version of biometric marker 105 replacing the original instance of image 103, or in some other manner.

Figure 3:
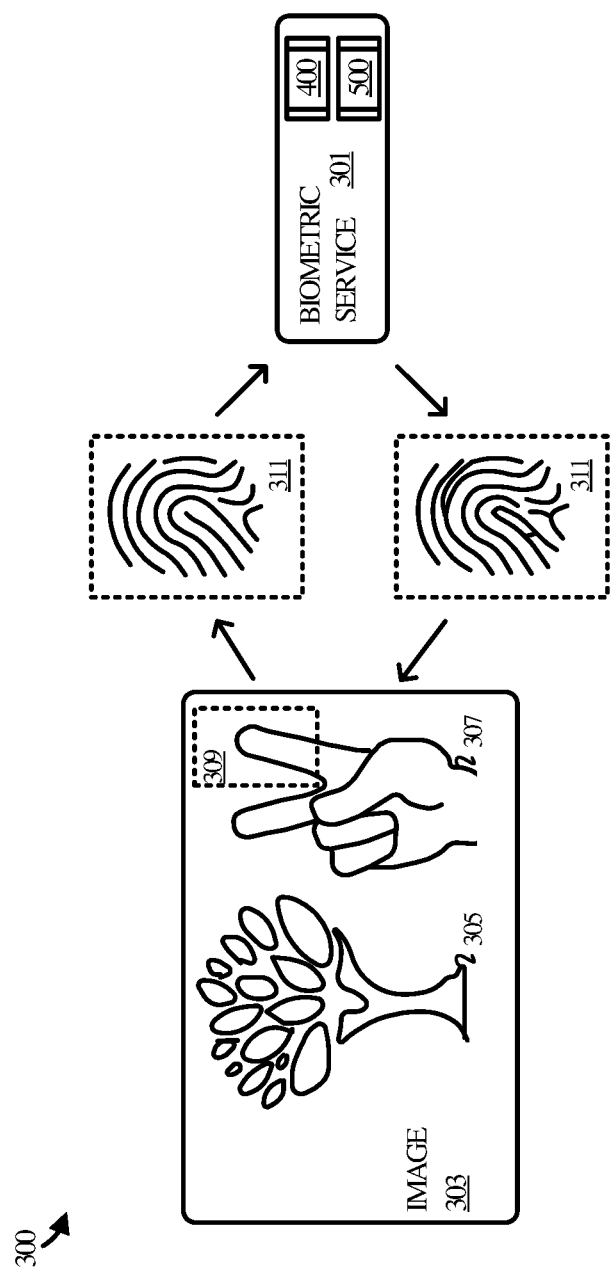
FIG. 3 illustrates another operational example of biometric privacy technology in an implementation.

FIG. 3 illustrates another operational example 300 of biometric privacy technology. Operational example 300 includes biometric service 301, which may be implemented as a software application or a feature thereof and on one or more computing systems, of which computing device 1001 in FIG. 10 is representative. For instance, biometric service 301 may be implemented on one or more user devices such as a mobile phone, digital camera, laptop computer, tablet computer, desktop computer, Internet of things (IoT) device, computer server device, virtual machine, container, appliance, or any other type of device.

Biometric service 301 may be implemented in a variety of computing environments, including local environments, remote environments, distributed environments, and cloud environments. Biometric service 101 employs production process 400 to identify and extract biometric markers from images and transformation process 500 to modify the biometric markers. Both processes may be implemented in program instructions in the context of any of the hardware, software, or firmware that comprises biometric service 301. The program instructions, when executed by one or more processors, direct one or more computing devices to operate as described herein for production process 400 and transformation process 500.

Figure 4:
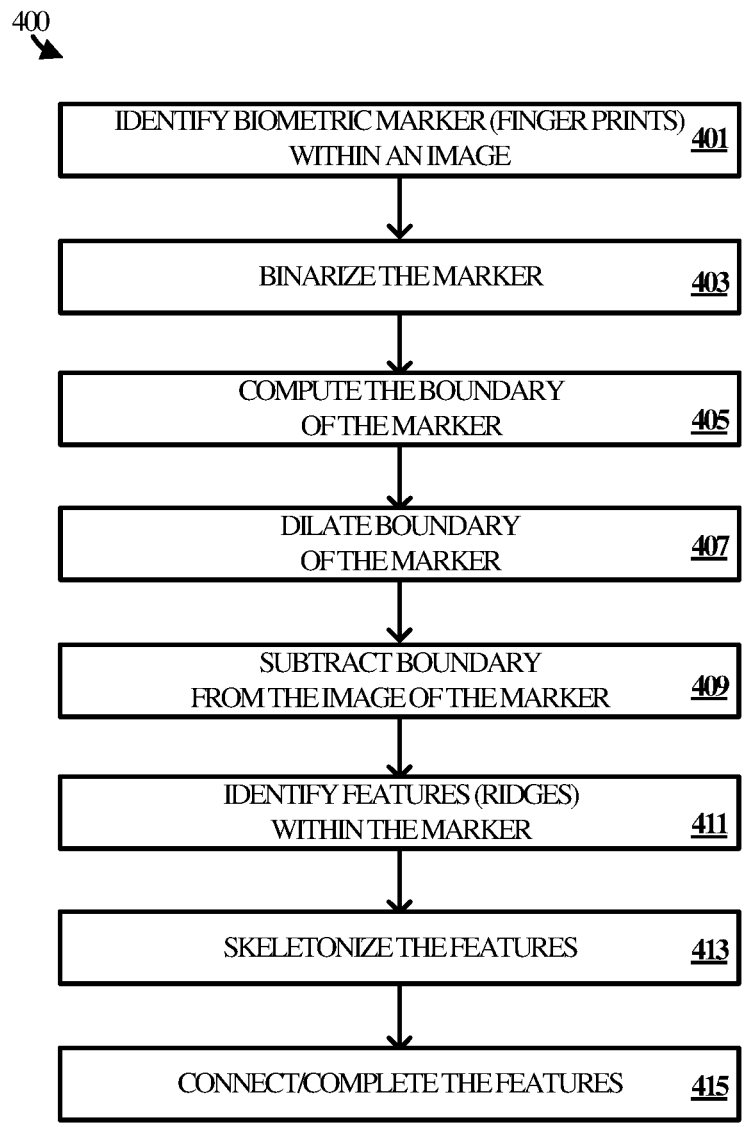
FIG. 4 illustrates a biometric production process in an implementation.

Referring parenthetically to the steps in FIG. 4, biometric service 303 takes an image as input and identifies one or more biometric markers within it (step 401), such as the ridges of a fingerprint. Biometric service 301 may identify the biometric marker(s) by employing a marker recognition algorithm capable of detecting fingerprints, retinas, irises, or other such markers in photographic images. Alternatively, biometric service 301 may employ a machine learning algorithm trained to identify such markers in images.

Next, biometric service 301 extracts an identified biometric marker from the image, generates a gray-scale image of the marker, and binarizes the gray-scale image (step 403). A NiBlack thresholding technique may be used to binarize the gray-scale image. The binarized image provides a clear perspective of the features of the biometric marker.

From the binarized image of the marker, biometric service 303 computes the boundary of the marker (step 405) and then dilates the boundary (step 407). Biometric service 303 also subtracts the dilated boundary from the marker image (step 409) to obtain an image of the features of the marker without boundary pixels, rather than the features and boundary pixels.

Biometric service 301 next identifies the features within the biometric marker (step 411) and skeletonizes the features (step 412). A standard extraction algorithm may be employed to extract the features. Skeletonizing the features reduces the foreground regions in a binarized image to a skeletal remnant that preserves the extent and connectivity of the original region while removing most of the original foreground pixels.

Some of the skeletonized features may be disconnected or incomplete. Biometric service 301 therefore connects or otherwise completes the features, allowing the features to be more readily compared to a set of reference features in the context of transformation process 500. For instance, biometric service 301 may complete some of the ridges in a fingerprint or some of the lines in a retina.

Figure 5:
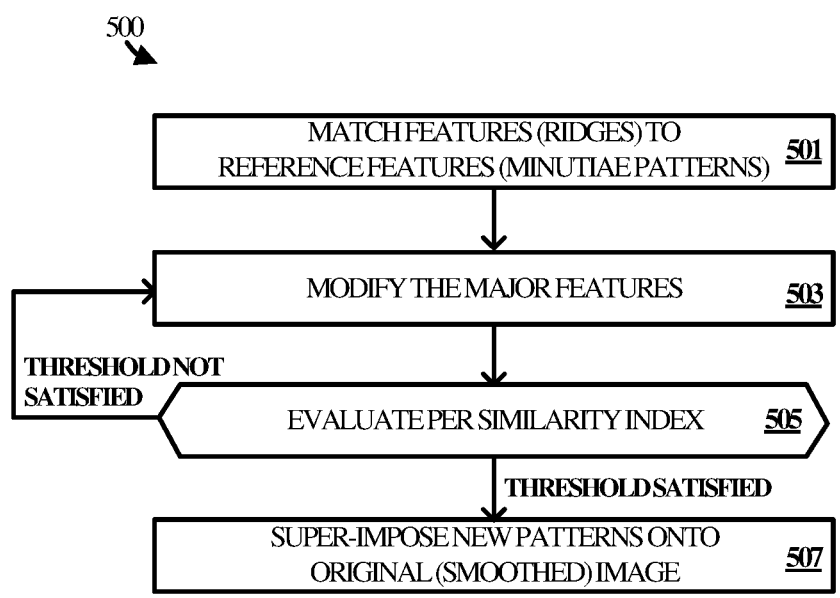
FIG. 5 illustrates a biometric transformation process in an implementation.

Turning to transformation process 500 in FIG. 5, biometric service 301 takes the image of the biometric marker produced by production process 400 as input and proceeds to match the features in the image to a set of reference features (step 501). In the case of fingerprints, for example, biometric service 301 compares the ridges and valleys of a fingerprint to a set of minutia patterns that are commonly found in fingerprints.

Next, biometric service 301 transforms the major features that were found during the matching process (step 503). Transforming the major features may include removing pixels, adding pixels, connecting lines, extending lines, or otherwise change the expression of a major feature.

Biometric service 301 then calculates a similarity index value for the image of the transformed biometric marker relative to the original version of the marker. Biometric service 301 compares the similarity index value to a threshold value to determine whether the transformed version of the marker is sufficiently dissimilar to the original version of the marker (step 505).

The index in one example is the structural similarity (SSIM) index. The value of the similarity index may be computed from the original marker image and the transformed marker image and is a scalar that represents how similar the transformed marker image is to the original version of the marker. For example, a value of 0.73 indicates that the transformed marker has 73% visual similarity to the original marker. The threshold may thus be a scalar value against which the similarity index can be evaluated.

If the similarity index value calculated for the transformed marker is too high (that is, if it exceeds the threshold value), that means that the transformed marker is too similar to the original image and would remain susceptible to misuse. In addition, if the similarity index value fails to satisfy the threshold criteria, then biometric service 301 further transforms the marker until the similarity index value satisfies the threshold criteria.

If, however, the similarity index calculated for the transformed marker is lower than the threshold value, that means that the transformed marker is sufficiently different from the original marker that the effects of any misuse would be mitigated. That is, the transformed marker would be different enough from the original marker that a malicious actor would be unable to use it for any malign purposes.

Once the similarity index value for the transformed version of the biometric marker meets the threshold criteria, biometric service 301 proceeds to super-impose the transformed version onto the original image of the scene (step 507). In some scenarios, the region of the scene that includes the biometric marker is first smoothed to eliminate (or reduce) the presence of the features of the biometric marker. Then, the features from the transformed version of the biometric marker can be super-imposed onto the smoothed image.

Referring back to FIG. 3, operational example 300 provides a brief illustration of production process 400 and transformation process as employed by biometric service 301 with respect to image 303. In operation, image 303 is taken of a scene which includes object 305 in the background and the hand 307 of a person in the foreground. Biometric service 301 examines image 303 for any regions 309 that may include biometric markers and detects the hand 307 with fingerprints facing outward from the image.

Next, biometric service 301 extracts an image 311 of a fingerprint from image 303 and prepares it to be obfuscated. First, biometric service 301 binarizes the image of the marker, computes its boundary, dilates the boundary, and then subtracts the boundary from the image. Biometric service 301 then identifies specific features within the marker and skeletonizes them. The skeletonized features are completed by biometric service 301, where appropriate.

The skeletonized features are thus ready to be compared and transformed. Biometric service 301 examines the features to determine if any match one of the features in a set of references features. Those that do are considered major features. Biometric service 301 proceeds to transform one or more of the major features until the similarity index for the transformed version of the biometric marker satisfies threshold criteria.

As may be apparent from FIG. 3, the transformed version of the biometric marker in image 311 differs from the original version of it, also in image 311. Namely, one ridge has been extended to form a bifurcation with another. In addition, another line segment has been added to create a new bifurcation and a crossover was created.

The image 311 of the modified version of the biometric marker may be re-integrated into image 303. For instance, biometric service 301 may super-impose the new version of the fingerprint onto a smoothed portion of hand 307.

FIG. 6 illustrates an operational scenario 600 in an example. In operation, a color image 601 of a fingerprint has been extracted from a photo of a scene by a biometric service. The color image 601 includes various ridges and valleys, represented by ridge 605. The ridges are depicted with dashed lines to represent color that in the natural would be similar to the color of the rest of the fingerprint 603.

In a first step, the biometric service converts the color image 601 from its original format (e.g. color) to a grey-scale image 611 of the biometric marker. It may be appreciated that the color image 601 in its original form contains several ridges that are incomplete, as does the version in the grey-scale image 611.

In a next step, the biometric service completes the incomplete lines and converts the grey-scale image 611 to a binarized image 621 such that the ridges stand out from the background. The ridges are depicted as solid lines in this step to represent that they are black against a white background.

The biometric service then compares the ridges of fingerprint 603 to a set of reference minutia, such as those illustrated in FIG. 7, to identify the major features of fingerprint 603.

FIG. 6 illustrates a set 601 of reference features in an implementation. The reference features are illustrated as straight-line versions of common fingerprint minutia that may be used to index fingerprints. It may be appreciated that non-straight versions are possible. The reference features include: a ridge termination; a bifurcation; an independent ridge; a dot (or island); a lake; a spur; and a crossover.

The exemplary minutia are depicted in FIG. 6 and include a lake (a), a bifurcation (b), and a crossover (c). The biometric service proceeds to transform the major features. For example: the lake (a) was modified to form a spur; the crossover (b) was modified to form a ridge termination; and the bifurcation (c) was modified to form a crossover. In addition, a new feature represented by a bifurcation (d) was added to the features.

In the meantime, the biometric service generates a smoothed image 631, which is a smoothed version of color image 601. That is, smoothed image 631 has had many (or all) of the features eliminated from its surface. The features from binarized image 621 may thus be super-imposed onto smoothed image 631, albeit in a color format to match the background skin color of the smoothed image 631 (represented by the dashed lines).

In this manner, a fingerprint extracted from a scene in an image is transformed such that it can no longer be misappropriated. The transformed fingerprint can be returned to the image—replacing the original fingerprint—so that the region from which the fingerprint was extracted retains its natural look and feel within the context of the scene.

Figure 8:
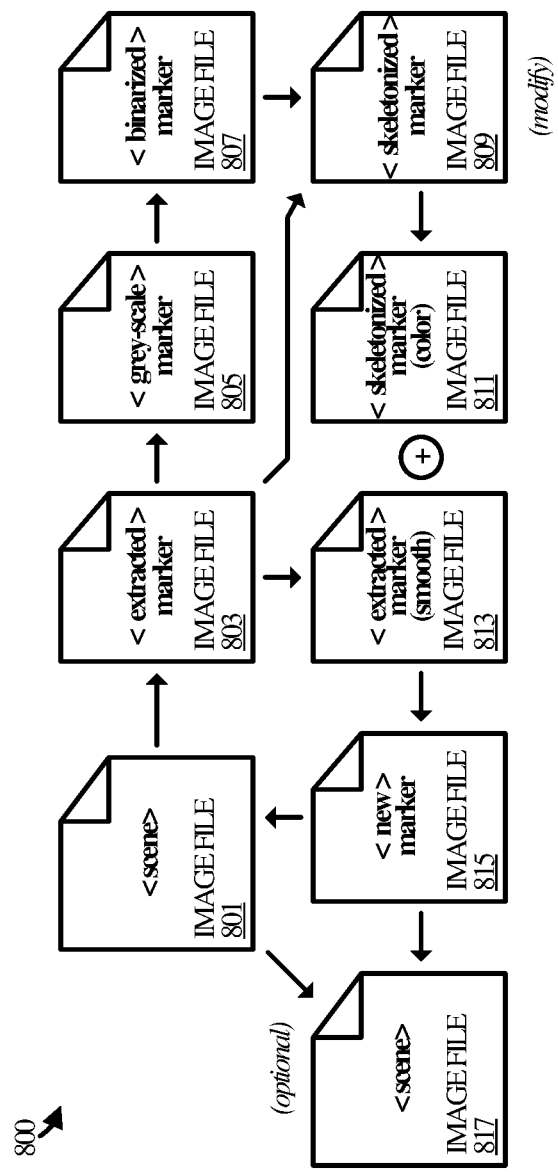
FIG. 8 illustrates an operational scenario in an in implementation.

FIG. 8 illustrates another operational scenario 800 in an implementation. Operational scenario 800 depicts one example information flow that may be utilized by a biometric service (e.g. biometric service 101 and 301) to enhance user privacy in images.

In operation, a scene is captured in an image and the data that comprises the image is stored in an image file 801. Image file 801 is any data file capable of storing image data in a suitable image format, such as JPEG, TIFF, GIFF, BMP, PNG, CGM, VSG, or any combination or variation thereof. Image file 801 may be produced from a photo, a video, or the like.

The biometric service scans the original image of the scene for the presence of biometric markers. It is assumed for exemplary purposes that at least one biometric marker in the form of a fingerprint is found. Biometric service extracts the biometric marker from the image and stores the image data for the biometric marker in image file 803. It may also be assumed for exemplary purposes that the image of the scene is a color image, as is the image of the biometric marker.

Extracting the biometric marker from the image may be accomplished by the biometric service reading out or otherwise copying data from image file 801 corresponding to a region in the image that surrounds the detected biometric marker. The data may be copied into a new file represented by image file 803. From there, biometric service creates a smoothed version of the image in image file 813. The smoothed version of the biometric marker lacks indications of the ridges and valleys in the fingerprint.

The biometric service also creates a grey-scale version of the image of the biometric marker in image file 805. Alternatively, image file 803 could be written-over rather than creating image file 805. The grey-scale image of the biometric marker retains the ridges and valleys of the fingerprint. The biometric service takes the grey-scale version and produces a binarized version of the fingerprint in image file 807. Alternatively, image file 805 could be written-over rather than creating image file 807. The binarized version also retains the ridges and valleys, but in greater relief relative to the grey-scale version.

The biometric service proceeds to skeletonize the biometric marker in image file 809. Alternatively, image file 807 could be written-over rather than creating image file 809. The skeletonized version of the biometric marker includes line segments of less width than those of the binarized version but still in black and white. It is the skeletonized version in image file 809 that the biometric service modifies in order to deform the features. Thus, image file 809 stores the pixel data that represents the biometric marker in its modified form.

The biometric service converts the skeletonized version from the binarized format to a color version that matches the original color of the ridges and valleys in image file 811. In some implementations, the biometric service simply changes the colors of the pixels to match an average color of the ridge pixels in image file 803. In other cases, the precise color values of the pixels in image file 803 corresponding to the pixels in image file 809 may be used. For any new segments that were added, the biometric service may use an average color value of a set of ridge pixels proximate to a given pixel, a predetermined pixel value, or some other color.

The skeletonized and color version of the biometric marker is then merged, blended, or otherwise added to the smooth version of the biometric marker in image file 813. The result is a new version of the biometric marker in image file 815. Alternatively, image file 813 could be written-over rather than creating image file 815.

The biometric service takes image file 815 and superimposes its contents into the original scene in image file 801. Alternatively, or optionally, the biometric service could create a copy of the original image in image file 817. The contents of image file 815 could then be superimposed onto the contents of image file 817 instead of (or in addition to) image file 801. In this manner, image file 801 may be preserved in its original form, rather than altered.

Figure 9:
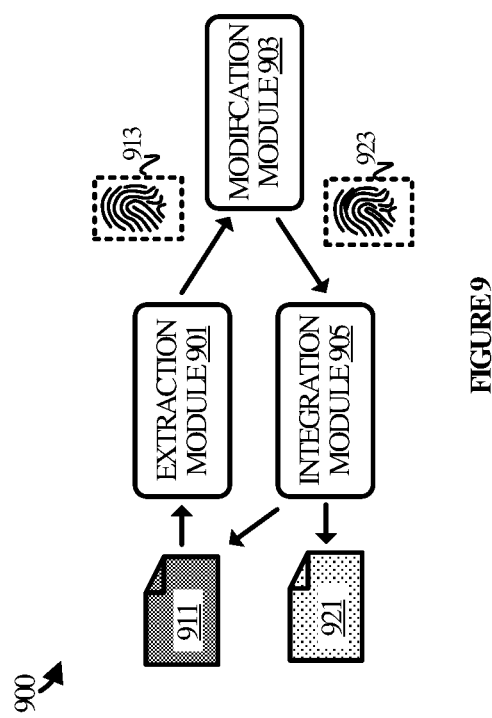
FIG. 9 illustrates an operational architecture in an implementation.

FIG. 9 illustrates an operational architecture 900 in an implementation. Operational architecture 900 is representative of a hardware, software, or firmware architecture for implementing a biometric service as disclosed herein. Operational architecture 900 includes extraction module 901, modification module 903, and integration module 905. Operational architecture 900 could be implemented on one or more computing devices, of which computing device 1001 in FIG. 10 is representative.

Extraction module 901 is representative of any hardware, software, or firmware component(s) capable of extracting a biometric marker from an image and transforming the biometric marker from its original state as found in the image to an enhance state to be analyzed by modification module 903. Extracting the biometric marker from an image may include, for example, copying a region of interest from the image that includes the biometric marker. Transforming the biometric marker may include binarizing the biometric marker, removing its boundary, and then skeletonizing the biometric marker. The product of extraction module 901 is a biometric marker in condition to be processed by modification module 903.

Modification module 903 is representative of any hardware, software, or firmware component(s) capable of detecting the features of a biometric marker and modifying at least a subset of them to deform the biometric marker. Detecting the features may include employing a feature recognition algorithm to recognize the major features of the biometric marker. Machine learning algorithms may be employed in some implementations. Modifying the features may include adding or removing segments (e.g. ridge lines), changing colors, or the like. Modification module 901 produces a modified biometric marker that has been transformed relative to the original biometric marker and passes it to integration module 905.

Integration module 905 is representative of any hardware, software, or firmware component(s) capable of integrating a modified biometric marker into an image. In some cases, integrating the modified biometric marker into an image may include superimposing it onto the original image from where it was extracted. In other cases, integrating the modified biometric marker may include superimposing it onto a copy of the original image. In either case, superimposing the biometric marker onto an image may include editing the pixel values of the image at positions in the image corresponding to the biometric marker. In addition, the pixel values may be set to the pixel values of the biometric marker, resulting in a reproduction of the modified biometric marker in the image.

FIG. 9 illustrates a brief operational scenario in an implementation. In operation, an image 911 is taken of a scene that includes one or more people such that one or more biometric markers are present in the image. For example, image 911 may be a selfie, a group photo, or the like, in which a person is posing with his or her fingers or palms facing outward such that their fingertips are visible. Image 911 may have been taken by an image capture device integrated with or separate from the computing device that employs operational architecture 900.

Image 911 may be stored in persistent storage or in memory. Extraction module 901 reads the image from its location and analyzes it for the presence of biometric markers such as fingerprints, retinas, and irises. In this case, extraction module 901 identifies at least one biometric marker, of which fingerprint 913 is representative.

Assuming image 911 is a color image, extraction module 901 copies a region surrounding the fingerprint in the image 911 and proceeds to transform it into a format for modification module 903. Namely, extraction module removes background pixels from the extracted image of the fingerprint and computes a grey-scale version of the fingerprint. The grey-scale image is then binarized using a NiBlack technique to bring the ridges of the fingerprint into greater relief.

The binarized version of the fingerprint may include a boundary line. Extraction module 911 computes the thumb boundary by first creating another binarized version of the fingerprint, but this time using a simple thresholding technique. This technique produces a "filled-in" version of the fingerprint such that all of the pixels within the boundary of the finger/thumb are black. Next, extraction module 901 defines a 3 by 3 window around each black pixel of the binarized image. The black pixel is considered a boundary pixel if any of the other pixels in the window are white.

After having identified the boundary pixels, extraction module proceeds to dilate the boundary line by adding pixels on either side of the existing pixels to the boundary line. Those pixels are then subtracted from the first binarized image that was created using the NiBlack technique. The result is an image of the fingerprint comprises of only its ridges and values and no (or few) boundary pixels.

Extraction module 901 may also produce a smoothed version of the extracted image of the finger/thumb. The smoothed version would retain its original colors, but the ridges or other features of a biometric marker would be smoothed over. That is, the pixel values of the ridge pixels would be changed to match the color of the non-ridge pixels.

In addition, extraction module 901 generates an image of the fingerprint ridges derived from the original image of the finger/thumb using the binarized image of the fingerprint as a map. That is, extraction module 901 is able to extract the pixels from the extracted image of the finger/thumb that correspond to the pixels of the binarized fingerprint. This version of the fingerprint will thus have the coloring of the fingerprint in the original image. Integration module 905 will leverage this version of the fingerprint when integrating the modified fingerprint into the original image (or a copy).

Lastly, extraction module 901 computers a skeletonized version of the binarized fingerprint image. The skeletonized version is one in which the ridge lines are thinned relative to their original thickness. Thinning the lines allows modification module 903 to more easily detect the various features in the fingerprint. Fingerprint image 913 is representative of the skeletonized image that extraction module 901 passes to modification module 903.

Modification module 903 takes the skeletonized version of the fingerprint as input and examines it to identify the major features in the fingerprint. Many different types of features exist, but modification module 903 searches for only a subset of them. The major features stand out the most and are the most consistent. Thus, they are good targets to be modified.

Having identified the major features of the fingerprint, modification module proceeds to deform them in various ways. Line segments may be added to a feature, for example, or removed from a feature. The modifications may be determined in a random (or pseudo) random way so that a malicious actor cannot reverse the modifications with any consistency. What to modify could range from which specific features to alter as well where in a given feature to make a change. For instance, if a line segment is being added, a random determination could be made with respect to where along a ridge the segment is to be placed. The biometric service may utilize a Bezier curve when adding line segments.

In some implementations, the modifications may encode tracking information that allows authorities to track down malicious actors and/or the source of any misuse. In such scenarios, a series of modifications could encode the Internet protocol (IP) address of a computer that requests a particular image. The image could be transformed on-the-fly and on a per-request basis to allow the computer's IP address to be encoded in the modifications made to the fingerprints. Then, when the malicious actor forges a replica fingerprint to use for illicit purposes, the fingerprint would leave a trail via the encoded IP address in its ridges and valleys.

Having identified which modifications to make, modification module 903 proceeds to change the pixels of the skeletonized version of the fingerprint to reflect the modifications. The skeletonized version of the fingerprint is then passed to integration module 905 to be integrated into the original image—or a copy represented by image 921. Fingerprint image 923 is representative of the modified fingerprint that modification module 903 passes to integration module 905.

Integration module 905 may integrate the modified fingerprint in a variety of ways. In a first step, integration module 905 edits the version of the fingerprint created by extraction module 903 using the skeletonized version as a map. Integration module 905 edits the corresponding pixels such that any added lines are reflected in the fingerprint while any removed lines are absent. Since this version of the fingerprint retains the original color of the extracted image, the completed fingerprint can be superimposed onto the smoothed version of the finger/thumb. Superimposing the image may entail editing the corresponding pixels of the smoothed version of the finger/thumb to match the values of the new fingerprint image. Integration module 905 then adds the completed image of the finger/thumb back into the original image of the scene.

In an alternative, integration module 905 may edit the pixel values of the original image directly using the skeletonized versions as a guide. For instance, integration module 905 could use the first skeletonized version of the fingerprint to identify the fingerprint pixels in the original image. Integration module 905 could then compare those pixels to the pixels in the second (modified) version of the skeletonized fingerprint to determine if a given pixel is a ridge pixel (or not). If so, then the color of the ridge pixel should be such that it differs from non-ridge (valley) pixels. If not, then the color of the ridge pixel should be changed to be the same or similar as the non-ridge pixels.

FIG. 10 illustrates computing device 1001 that is representative of any system or collection of systems in which the various processes, programs, services, and scenarios disclosed herein may be implemented. Examples of computing device 1001 include, but are not limited to, server computers, cloud computing platforms, and data center equipment, as well as any other type of physical or virtual server machine, container, and any variation or combination thereof. Other examples include mobile phones, desktop computers, laptop computers, tablet computers, Internet of Things (IoT) devices, wearable devices, digital cameras, gaming devices, and any other physical or virtual combination of devices or variations thereof.

Computing device 1001 may be implemented as a single apparatus, system, or device or may be implemented in a distributed manner as multiple apparatuses, systems, or devices. Computing device 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009. Computing device 1001 may optionally include an image capture in some implementations, such as when computing device 1001 is a mobile phone, digital camera, or the like. Image capture system 1011 may be a peripheral or may be integrated with the rest other components of computing device 1001.

Processing system 1002 loads and executes software 1005 from storage system 1003. Software 1005 includes and implements biometric service 1006, which is representative of the biometric services discussed with respect to the preceding Figures (e.g. biometric service 101 and 301). When executed by processing system 1002 to provide enhanced biometric privacy, software 1005 directs processing system 1002 to operate as described herein for at least the various processes, operational scenarios, and sequences discussed in the foregoing implementations. Computing device 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including biometric service 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing enhanced biometric privacy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing device 1001 is representative) overall from a general-purpose computing system into a special-purpose computing system customized to provide enhanced biometric privacy. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Image capture system 1011, which is optional, may include components capable of capturing photos or video of a scene. Examples include the lenses, sensors, and other digital camera components that may be integrated with or peripheral to the remainder of computing device 1001. Image capture system 1011 may be present when, for example, computing device 1001 comprises a mobile phone, a laptop, a tablet, a wearable device (e.g. a watch or eye glasses), or any other device having a camera included therewith.

Communication between computing device 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Various embodiments of the present technology provide for a wide range of technical effects, advantages, and/or improvements to computing systems and components. For example, the biometric service disclosed herein improves the privacy of biometric markers that may be found in images disseminated online or elsewhere. In addition, the quality of the images is maintained while enhancing privacy. That is, by modifying the features of a biometric marker rather than obscuring them, the images retain their aesthetically pleasing aspects. In some scenarios, modifying a limited number of features (the major features) reduces processing time while increasing the likelihood that the modifications are effective from a fraud prevention standpoint.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method to protect user privacy in images, the method comprising:
   identifying one or more features of a biometric marker in an image;
   identifying one or more modifications to make to the one or more features of the biometric marker;
   generating a modified version of the biometric marker that reflects the one or more modifications to the one or more features, wherein generating the modified version comprises generating a skeletonized image of the biometric marker and making the one or more modifications to the one or more features in the skeletonized image of the biometric marker; and
   updating the image with the modified version of the biometric marker.

2. The method of claim 1 wherein identifying the one or more features of the biometric marker to be modified comprises, for each feature of the one or more features, matching the feature to a one of a set of reference features most similar to the feature.

3. The method of claim 2 wherein, for each of the one or more features, matching the feature to the one of the set of reference features most similar to the feature comprises comparing characteristics of a straight-line version of the feature to characteristics of straight-line versions of the set of reference features.

4. The method of claim 3 wherein the characteristics of the straight-line version of the feature comprise a number of angles, a number of segments, and a set of normalized coordinates.

5. The method of claim 1 wherein making the one or more modifications to the one or more features in the skeletonized image of the biometric marker comprises:
   adding segments to the one or more features; and
   removing other segments from the one or more features.

6. The method of claim 1 wherein updating the image with the modified version of the biometric marker comprises changing pixel values of the image based on the skeletonized image of the modified version of the biometric marker.

7. The method of claim 1 wherein the biometric marker comprises a fingerprint and the one or more features comprise minutiae patterns in the fingerprint.

8. The method of claim 1 further comprising encoding tracking information in the modified version of the biometric marker to identify a source of misuse.

9. A computing apparatus comprising:
   an image capture device configured to capture an image; and
   a processor operatively coupled with the image capture device and configured to:
     extract a biometric marker from the image;
     identify one or more features of the biometric marker to be modified;
     identify one or more modifications to make to the one or more features of the biometric marker;
     generate a modified version of the biometric marker that reflects the one or more modifications to the one or more features, wherein to generate the modified version, the processor is further configured to generate a skeletonized image of the biometric marker and make the one or more modifications to the one or more features in the skeletonized image of the biometric marker, resulting in the modified version of the biometric marker; and
     update the image with the modified version of the biometric marker.

10. A computing apparatus comprising:
    one or more computer readable storage media; and
    program instructions stored in the one or more computer readable storage media that, when executed by a processor, direct the computing apparatus to at least:
      extract a biometric marker from an image;
      identify one or more features of the biometric marker to be modified;
      identify one or more modifications to make to the one or more features of the biometric marker; and
      generate a modified version of the biometric marker that reflects the one or more modifications to the one or more features,
      wherein to generate the modified version, the program instructions further direct the computing apparatus to generate a skeletonized image of the biometric marker and make the one or more modifications to the one or more features in the skeletonized image of the biometric marker, resulting in the modified version of the biometric marker.

11. The computing apparatus of claim 10 wherein to identify the one or more features of the biometric marker to be modified, the program instructions direct the computing apparatus to, for each feature of the one or more features, match the feature to a one of a set of reference features most similar to the feature.

12. The computing apparatus of claim 11 wherein, for each of the one or more features, to match the feature to the one of the set of reference features most similar to the feature, the program instructions direct the computing apparatus to compare characteristics of a straight-line version of the feature to characteristics of straight-line versions of the set of reference features.

13. The computing apparatus of claim 12 wherein the characteristics of the straight-line version of the feature comprise a number of angles, a number of segments, and a set of normalized coordinates.

14. The computing apparatus of claim 10 wherein the modifications to the one or more features in the skeletonized image of the biometric marker comprise segments added to the one or more features and other segments removed from the one or more of the features.

15. The computing apparatus of claim 10 wherein to update the image with the modified version of the biometric marker, the program instructions direct the computing apparatus to change pixel values of the image based on the skeletonized image of the modified version of the biometric marker.

16. The computing apparatus of claim 10 wherein:
    the biometric marker comprises a fingerprint; and
    the one or more features comprise minutiae patterns in the fingerprint.

17. The computing apparatus of claim 10 wherein the program instructions further direct the computing apparatus to encode tracking information in the modified version of the biometric marker to identify a source of misuse.

18. The computing apparatus of claim 10 wherein the program instructions further direct the computing apparatus to:
    determine a similarity of the modified version of the biometric marker to the biometric marker as-extracted from the image;

determine whether the similarity satisfies a similarity threshold;

identify additional modifications to make to the one or more features of the biometric marker if the similarity fails to satisfy the similarity threshold; and update the image with the modified version of the biometric marker.

\* \* \* \* \*